(12) United States Patent
Woolpert

(10) Patent No.: US 9,910,286 B2
(45) Date of Patent: Mar. 6, 2018

(54) TWINSCOPE 3-D VIEWER

(71) Applicant: Colleen Woolpert, Syracuse, NY (US)

(72) Inventor: Colleen Woolpert, Syracuse, NY (US)

( * ) Notice: Subject to any disclaimer, the term of this patent is extended or adjusted under 35 U.S.C. 154(b) by 35 days.

(21) Appl. No.: 14/944,966

(22) Filed: Nov. 18, 2015

(65) Prior Publication Data

US 2016/0147077 A1    May 26, 2016

Related U.S. Application Data

(60) Provisional application No. 62/083,008, filed on Nov. 21, 2014.

(51) Int. Cl.
*G02B 27/22* (2006.01)

(52) U.S. Cl.
CPC ................. *G02B 27/2242* (2013.01)

(58) Field of Classification Search
CPC .......... G02B 23/00; G02B 7/021; G02B 7/02; G02B 7/04; G02B 7/06; G02B 27/22; G02B 27/2257; G02B 27/02; G02B 27/04; G02B 27/2242; G02B 27/022; G02B 27/028; G02B 27/2228; G02B 27/26; H04N 13/02; H04N 13/04
USPC .......................................................... 359/477
See application file for complete search history.

(56) References Cited

U.S. PATENT DOCUMENTS

| 724,044 | A | 3/1903 | Richmond |
| 756,692 | A | 4/1904 | Pappenhagen |
| 1,520,311 | A | 12/1924 | Ruth |
| 2,528,673 | A | 11/1950 | Taylor |
| 2,733,635 | A | 2/1956 | Crandall |
| 2,781,042 | A | 2/1957 | Bartow |
| 2,791,051 | A * | 5/1957 | Scheyer ................. A47G 1/162 248/497 |
| 2,849,917 | A | 9/1958 | Petri |
| 4,730,898 | A | 3/1988 | Curtin |
| 4,864,646 | A * | 9/1989 | Nesbit .................... H04B 1/088 455/344 |
| 4,952,024 | A | 8/1990 | Gale |
| 5,124,840 | A | 6/1992 | Trumbull et al. |
| 5,615,046 | A | 2/1997 | Gilchrist |
| 5,880,773 | A | 3/1999 | Suzuki |

(Continued)

FOREIGN PATENT DOCUMENTS

| EP | 0932065 A1 * | 7/1999 | ............. G02B 23/18 |
| GB | 190110428 A * | 6/1901 | ............. G02B 27/22 |

OTHER PUBLICATIONS

Berezin (Berezin Stereo Photography products, https://web.archive.org/web/20080606050811/http://www.berezin.com/3d/holmes.htm, Jun. 6, 2008, p. 1).*

*Primary Examiner* — Stephone B Allen
*Assistant Examiner* — Jyotsna Dabbi
(74) *Attorney, Agent, or Firm* — Bernhard P. Molldrem, Jr.

(57) ABSTRACT

A stereoscope is used for viewing a stereographic pair of images that are placed side-by-side on a card or presented on a digital screen. A lens board has left and right apertures defining a horizontal base line. A pair of prismatic lenses are fitted into the left and right apertures, respectively. A stem or handle projects from the lens board in the plane of the lens board midway between the apertures and perpendicular to the base line. A removable opaque synthetic rubber hood is fitted onto the lens board and has eye covers of generally tubular shape.

7 Claims, 3 Drawing Sheets

(56) References Cited

U.S. PATENT DOCUMENTS

| | | |
|---|---|---|
| 5,943,165 A | 8/1999 | Huang |
| 6,067,192 A | 5/2000 | Lichtenfield et al. |
| 6,304,287 B1 | 10/2001 | Nagata |
| RE40,131 E * | 3/2008 | Jones ................. G02B 27/2257 359/466 |
| 8,953,242 B2 | 2/2015 | Larson et al. |
| 2010/0018102 A1 * | 1/2010 | Minges ................. A01M 31/02 42/94 |
| 2012/0057133 A1 | 3/2012 | Robinson |

* cited by examiner

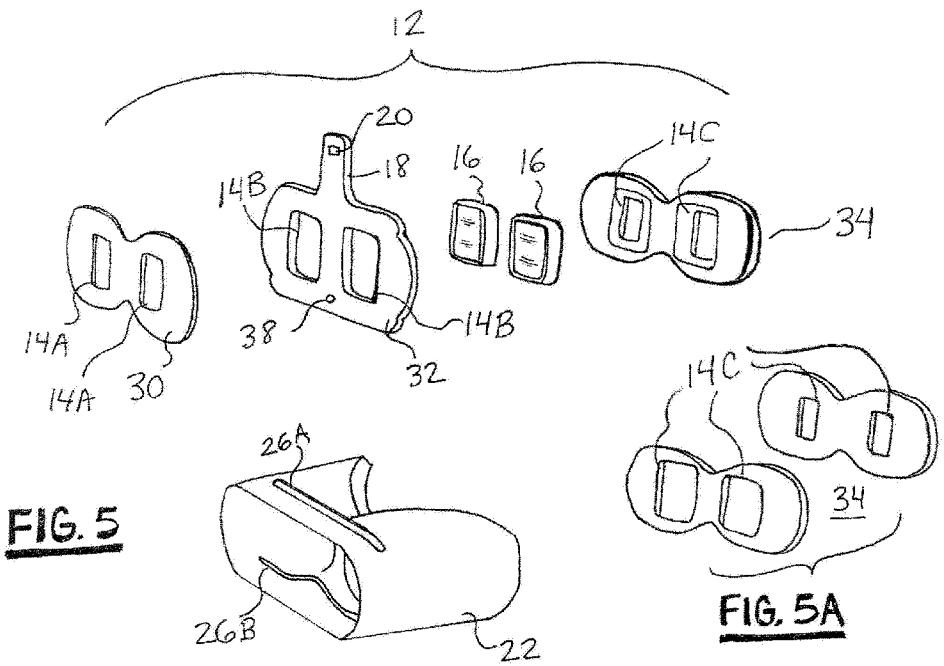
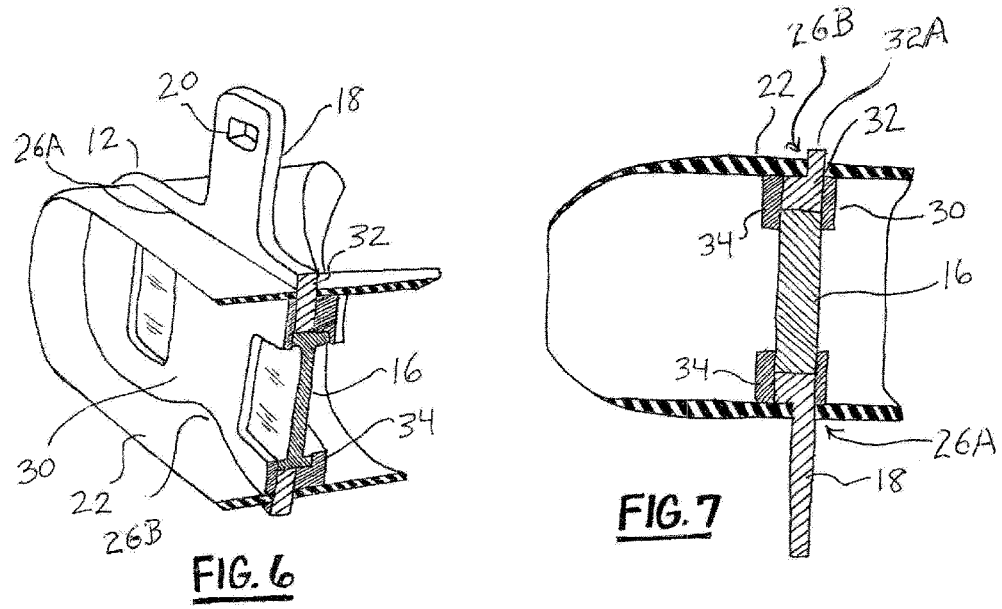

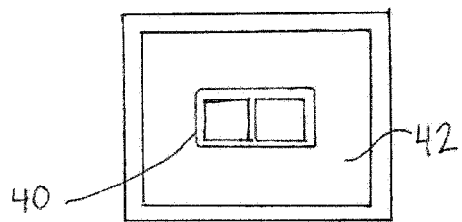
FIG. 8
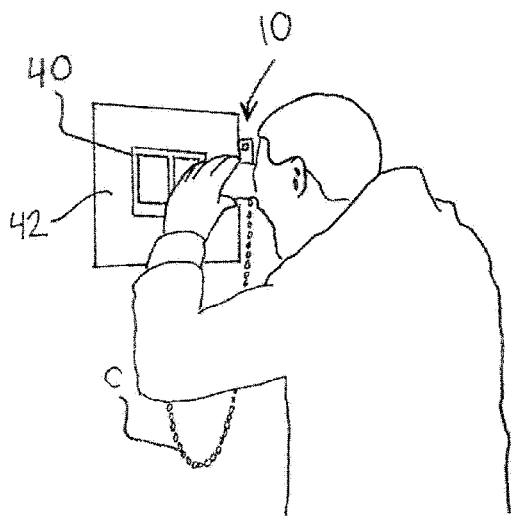
FIG. 9
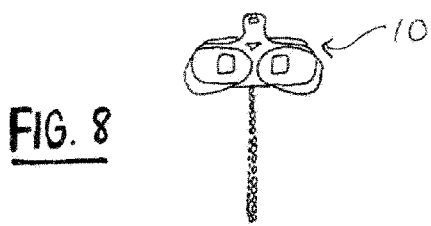
FIG. 10
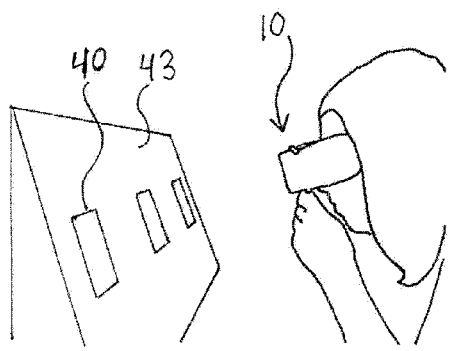
FIG. 11
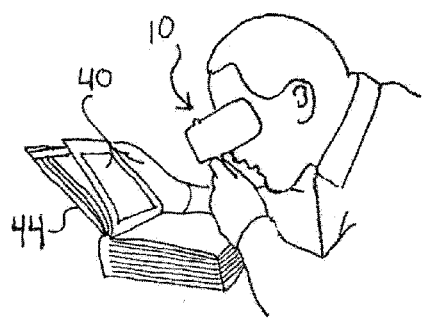
FIG. 12

US 9,910,286 B2

TWINSCOPE 3-D VIEWER

Priority is claimed under 35 U.S.C. 119(e) of provisional U.S. Patent Application Ser. No. 62/083,008, filed Nov. 21, 2014.

BACKGROUND OF THE INVENTION

Stereographs (also known by names such as stereograms, stereo views, stereo cards stereoscopic cards, etc.) were a popular hand-held amusement between 1850-1930. Stereographs were made by taking two photographs of the same scene at positions separated by a distance roughly equivalent to the distance between the eyes. The photographs were then pasted side-by-side onto a heavy card measuring roughly 3.5 inches high×7 inches wide. Viewed through a stereoscope, one saw the illusion of a 3D image similar to normal binocular vision. Today, stereographs can be found in the archives of museums and libraries, as well as in antique stores and attics. They are beloved by collectors and are enjoying a comeback in this age of 3D movies and TV. Some contemporary artists also make images in the stereograph format.

The Holmes-type stereoscope, designed by Oliver Wendell Holmes in 1859 and copied by many manufacturers, was the common device for viewing stereographs. Although long-regarded as the best solution for stereograph viewing due to its fine optics, light-blocking lens hood, and easy focusing, the Holmes viewer is seldom available for use in public archives because it is a fragile antique, vulnerable to wear. Sometimes a Holmes viewer is included in an exhibition with a stereograph in its holder, but usually this configuration is inside a display case and not intended for functional use. Most importantly in relation to my invention, the Holmes viewer was designed for hand-held viewing of stereographs and is altogether useless for viewing stereographs that are framed or in exhibition cases. In this form of presentation, oftentimes no viewer is provided, although sometimes inferior viewers are utilized (such as lorgnettes which have poor optics, lack a lens hood and are difficult to use).

OBJECTS AND SUMMARY OF THE INVENTION

The invention, the TwinScope Viewer, is a stereoscope or three-dimensional viewer that addresses these problems and gives other improvements for the viewing of stereographs or other side-by-side stereoscopic images that have a combined width of not more than eight inches. The TwinScope Viewer was originally conceived as an elegant, easy-to-use hanging stereoscope that borrowed some features from the Holmes viewer (namely, high-quality prismatic lenses and a lens hood) for viewing stereographs that are framed or in display cases. However, the TwinScope Viewer is also an excellent replacement for the Holmes viewer for hand-held viewing, with the advantages of being more rugged, fitting over eye glasses, and not requiring that stereographs be placed into metal holders that can damage the card edges. The TwinScope 3-D Viewer can also be used for viewing stereo images in a variety of other applications, for example as presented side-by-side on the screen of a smart phone or tablet.

BRIEF DESCRIPTION OF THE DRAWING

FIG. 5 is an exploded assembly view thereof.

FIG. 5A is an exploded view of one portion of the assembly of FIG. 5

FIG. 6 is a partly cut-away perspective view thereof.

FIG. 7 is a cross-sectional view thereof.

FIGS. 8 to 12 are environmental views thereof;

FIG. 8 showing the stereoscope suspended on a wall below a framed stereograph;

FIG. 9 shows persons using the stereoscope to view a stereograph framed and mounted on a wall;

FIG. 10 shows the invention used for viewing a hand-held stereograph or digital device;

FIG. 11 shows a user viewing stereoscopic cards in a display case;

FIG. 12 shows a user viewing a stereographic image printed in a book.

DETAILED DESCRIPTION OF THE PREFERRED EMBODIMENT

Figure 1:
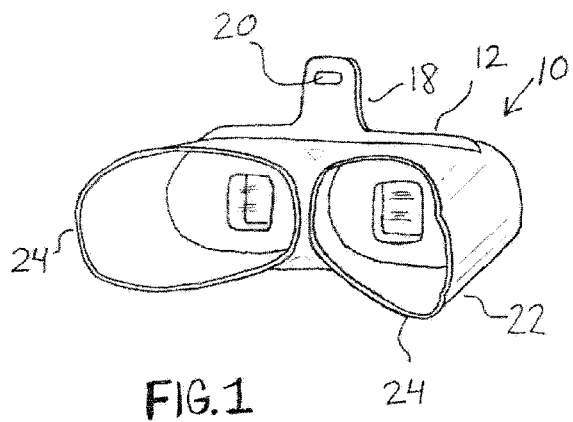
FIG. 1 is a proximal perspective view of the TwinScope Viewer according to a preferred embodiment

With reference to the Drawing and initially to FIGS. 1 to 7, the TwinScope Viewer or stereoscope 10 is designed for viewing stereographs or other side-by-side stereoscopic images that have a combined width of not more than eight inches. The stereoscope 10 is designed to be used in the stem-up or stem-down position for viewing stereographs in a variety of configurations, including those that are framed for wall display, as well as stereographs in display cases, reprinted in books, viewable on a computer monitor or other digital device, or held loose in the hand. The TwinScope Viewer can be used with stereo image pairs that are up to about eight inches left-to-right and about four inches in height.

Figure 2:
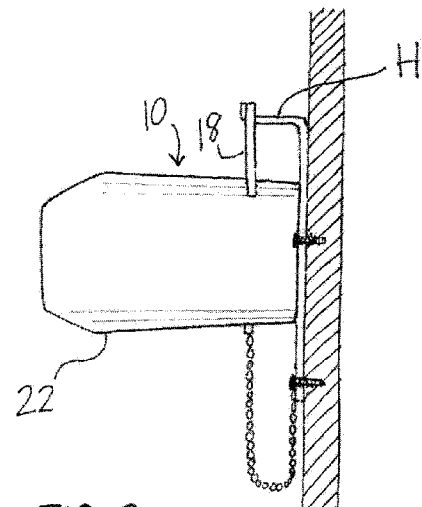
FIG. 2 is a side view, showing the viewer of this embodiment suspended from a wall hanger.
Figure 3:
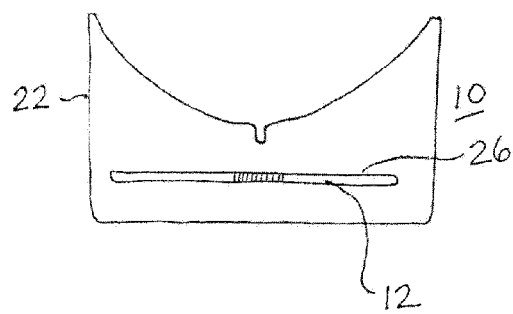
FIG. 3 is a top view of the viewer of this embodiment.
Figure 4:
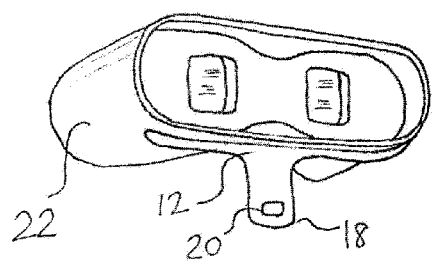
FIG. 4 is a distal perspective view.

Here the stereoscope has a lens board 12 that is formed of three flat members that are cemented together (as shown in FIGS. 5, 5A, 6 and 7), with rectangular openings 14 within which the left and right prismatic lenses 16 are mounted. A stem or handle 18 projects from the center of the lens board, between the two lenses, at either the top (as seen in FIGS. 1 and 2) or the bottom if the stereoscope 10 is inverted (as seen in FIG. 4). There is a slot formed near the end of the stem 18 which can serve for hanging the stereoscope on a wall hanger H (FIG. 2) that fits through the slot 20. If desired, a chain or lanyard C can be attached to the opposite side of the lens board 12 with its other end attached to the wall, with enough length so that the stereoscope can be used easily by museum or gallery visitors, but will ensure that the stereoscope stays on station at or near the desired location. The hanger H may instead be attached to a post, pedestal, horizontal surface, or other station.

The stereoscope 10 can be made in a variety of materials if desired, e.g. a durable plastic resin or a metal such as an aluminum alloy. The following preferred embodiment describes a stereoscope made of synthetic rubber and wood.

A hood 22 molded of synthetic rubber has an oval overall shape, with generally tubular eye cups or lens barrels 24 at the proximal side only (the side facing the user) to shield the eyes from stray light and to separate the views, ensuring that the left eye sees the left view and the right eye sees the right view, and leaving the portion at the far side of the lens board open. Slots 26A and 26B at the upper and lower sides accommodate the lens board 12, as shown so that the hood 22 and lens board 12 hold one another in place. One slot 26A lodges onto the stem or handle 18 that projects out the slot 26A in the plane of the lens board 32, and a ridge or flange 32A on the other (upper) edge of the lens board (as shown in FIG. 7) lodges in the other slot 26B. The stereoscope 10 thus has an overall shape resembling that of a pair of binoculars, making the use of the stereoscope more-or-less intuitive so the user does not need instructions. That is, the shape of the stereoscope itself suggests to the user how to hold it to the face for use.

As shown in FIGS. 5 to 7 the lens board if constructed as three main portions, namely a forward (proximal) board 34 a central board 32 and a rear (distal) board 30. In this embodiment, these three boards are wood, and the forward and rear boards 34 and 30 have their grain running horizontally (left to right), but the central board 32 has its grain running vertically (up and down). The stem or handle 18 is formed unitarily as a part of the central board 32. The vertical grain direction means that the handle 18 is not weakened by the presence of the slot 20 that is cut through it. Also, the lamination of three boards 30, 32, and 34 with crossed grain directions adds strength to the lens board 12 as an assembly, and does help prevent warping. The central board 32 is shown with an aperture 38 opposite the stem or handle 18, and the chain C or lanyard can be connected at this aperture. As seen in FIG. 5A, the proximal board 34 can have a vertical grain portion and a horizontal grain portion, as two pieces glued or secured together, with the lens board then being four pieces laminated together instead of only the three pieces in the version just discussed.

In order to create an ideal 3D illusion, a precise distance is given between the lenses, and the dimensions of the windows cut into the lens boards are specially designed. The three boards 30, 32, 34 each have respective lens openings 14A, 14B, 14C which are generally in registry with one another, except that the proximal board openings 14C are not as wide and the inner edges are farther out from center than in the distal board openings 14A. This configuration mitigates ghosting, i.e., seeing a portion of the image to the sides of the 3D image (a problem with Holmes viewers), giving instead the illusion of a single 3D image with only a frame edge around it (said frame being the card stock or whatever material immediately abuts the images). The lenses themselves are of a square shape but otherwise have generally spherical surfaces but also with a somewhat wedge or prism shape to bend the images toward the eyes. One of the lens board openings, e.g. openings 14C, can have ledges or shoulders to help hold the respective lenses 16 in place.

As shown in FIG. 8, the stereoscope 10 can be kept hanging from a wall hook beneath or near a stereograph 40, here mounted in a matt and frame 42 hung on the wall. The chain C (shown in FIG. 9) can be attached to the wall and to the stereoscope 10 so that the unit remains in place near the stereograph or stereographs that are on exhibit. FIG. 9 shows a gallery visitor using the stereoscope 10 for viewing a stereograph in this manner. Here the visitor has picked up the hanging stereoscope with both hands on the side of the hood 22, and brings it into position in front of the eyes, although it can also be held in an inverted, stem-down position, as shown in FIG. 11.

When using a stereoscope to look at a stereograph that cannot be held in the hand, as in FIGS. 8, 9, and 11, focus is achieved by the user changing his or her distance in relation to the stationary stereograph. FIG. 11 shows a person viewing stereographs in a display case 43.

FIGS. 10, 11 and 12 show persons holding the stereoscope 10, inverted in respect to FIG. 9, with the stem downward. The visitor holds the stem, now serving as a handle, with one hand, and if the stereograph or object containing the stereo imagery 40 can be held in the other hand, as in FIG. 10, the user achieves focus by moving the stereograph or object closer or further away from the eyes.

FIG. 12 shows a person looking at stereo imagery in a book 44. In this case, either the stereoscope or the book may be moved to achieve focus.

Whether focusing with the stein in the upward or downward position, focal distance is individual for each user, but is typically between six and eight inches away.

The lens barrels or eye covers 24 of the hood 22 are designed to fit over eyeglasses if worn by the user, so the user does not have to remove his or her eyeglasses when using the TwinScope Viewer. Also, the design of the stereoscope is generally symmetrical (except for the stem 18) relative to the horizontal base line through the lens openings 14, and the stereoscope can be used either with the stem up or with the stem down, depending upon the user's preference. In these examples, it is possible to use the viewer without the hood 22 in place.

Unlike previous viewers such as the Holmes stereoscope, the stereoscope of this invention does not have a rod or holder extending forward, nor metal brackets to hold the stereograph. The absence of any forward protuberance allows the TwinScope Viewer to be used with stereo images that are not hand-held (the stereoscope does not actually contact the stereo image). The lack of metal brackets protects the stereograph from wear and potential damage caused by placing the stereograph in and out of said brackets.

There are many variations possible without departing from the main principles stereoscope is constructed or the ways in which it is used.

What is claimed is:

1. A stereoscope configured for viewing a pair of images that are placed side-by-side, comprising a lens board having left and right apertures defining a horizontal base line, said lens board defining a plane;

a pair of prismatic lenses fitted into the left and right apertures, respectively;

a stem portion unitary with said lens board and projecting from the lens board in the plane of the lens board midway between the apertures and perpendicular to said base line;

wherein said stem portion has a horizontal slot extending through said stem and partway across the stem, and said horizontal slot being configured to receive a wall hook therethrough, whereby the stereoscope can be suspended on a wall or pedestal; and wherein said lens board has an aperture formed therein on an edge opposite to said stem portion, and said stereoscope further comprising a chain or cable connected at one end to said aperture in said lens board and connected at an opposite end to an anchor point on said wall or pedestal.

2. A stereoscope according to claim 1 further comprising a hood fitted onto said lens board and including left and right separate eye covers of generally tubular shape extending proximally in respect to said lens board only on the proximal side of said lens board.

3. A stereoscope according to claim 2 wherein said hood is molded of a flexible synthetic rubber.

4. A stereoscope according to claim 3 wherein said hood has upper and lower transverse slots adapted to lodge onto upper and lower edges of the lens board for removably retaining the hood on the lens board.

5. A stereoscope according to claim 1 wherein said lens board is formed of a distal lens board component, a central lens board component, and a proximal lens board component, the lens board components being affixed to one another and each having left and right lens openings with the left lens openings of the three board components aligned with one another and the right lens openings of the three board components aligned with one another, and with said lenses being secured therein between the proximal and distal lens board components.

6. A stereoscope according to claim 5 wherein said stem portion is formed unitarily with said central lens board component.

7. A stereoscope according to claim 6 wherein said distal and proximal lens board components are of wood with a grain direction running horizontally, and said central board component is of wood with its grain direction running vertically.

\* \* \* \* \*